June 14, 1960  S. GUSMAN ET AL  2,940,872
METHOD OF COATING METAL AND ARTICLE PRODUCED THEREBY
Filed Aug. 28, 1957
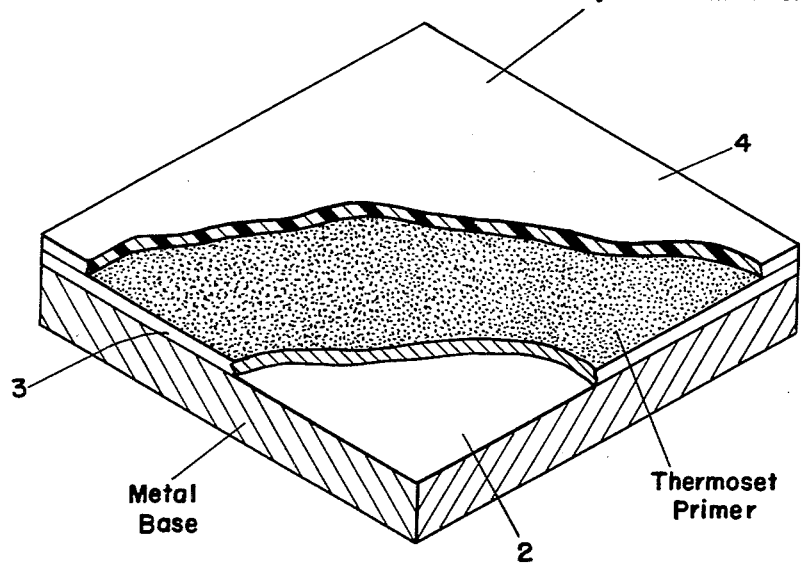

United States Patent Office  2,940,872
Patented June 14, 1960

2,940,872

METHOD OF COATING METAL AND ARTICLE PRODUCED THEREBY

Samuel Gusman, Wyncote, and Sidney Melamed, Philadelphia, Pa., assignors to Rohm & Haas Company, Philadelphia, Pa., a corporation of Delaware Filed Aug. 28, 1957, Ser. No. 680,672

19 Claims. (Cl. 117—75)

This invention relates to lacquers and lacquer finishing. It is particularly concerned with new lacquer compositions based on certain methacrylate copolymers and adapted to be applied by commercial spraying techniques. It is also concerned with the finishing of surfaces, especially of metals, with the lacquers of the present invention.

Poly(methyl methacrylate) is highly regarded as a coating material because of its durability, particularly its high retention of gloss and color, when pigmented, during prolonged outdoor exposure. Because of this quality, it has long been desired to use poly(methyl methacrylate) lacquers for the finishing of automobile bodies as well as other metallic articles subject to outdoor exposure. However, such lacquers have poor adhesion to metals directly and also poor adhesion to coatings obtained from primers of the "baking" type. While their adhesion to such primers can be somewhat improved by roughening of the exposed surface of such primer coatings, as by a sanding operation, and such roughening is frequently resorted to in any event to improve adhesion, the improvement thereby obtained is not as pronounced as would be desirable nor is it practical to roughen the primer in all of the indentations that are present in such structures as automobile bodies. It is characteristic of this system that the adhesion of the poly(methyl methacrylate) to the primer improves with age. Very shortly after application, however, there is insufficient adhesion between the primer coating and the poly(methyl methacrylate) coating to allow the application of masking tape when a multi-color pattern of decoration is desired. In such an event, the masking tape, when removed, removes the poly(methyl methacrylate) top coat. For this reason, the application of poly(methyl methacrylate) is restricted.

Consequently, when poly(methyl methacrylate) lacquers are applied, a "non-baking" type of lacquer is generally applied as a primer or as an intermediate coat between the primer of "baking" type and the poly(methyl methacrylate) lacquer. Common non-baking lacquers that may be so used contain nitrocellulose, such as a solution of nitrocellulose and a plasticizer therefor with or without additional film-forming materials, such as polyvinyl butyral.

In accordance with the present invention, it has been found that the incorporation of 0.5% to 10% by weight, based on the total weight of the copolymer, of dimethylaminoethyl methacrylate into lower alkyl methacrylate polymers markedly enhances the adhesive properties of the polymers toward baking primers in general so that lacquers made therefrom can be applied directly over a baking primer without the necessity to employ an intermediate or sealer coat of a non-baking type. Preferably, to obtain the optimum adhesion in conjunction with outdoor durability, the lacquers of the present invention are based on the use of copolymers of lower alkyl methacrylate with 2% to 4% in the polymer molecule of dimethylaminoethyl methacrylate. The lacquer may contain an external plasticizer for the polymer or the polymer may be itself modified by the incorporation of flexibilizing comonomers so that the copolymer in the lacquer contains three or more different comonomer units and is internally plasticized by virtue of certain of those units. This is particularly true when the copolymer is derived from methyl methacrylate. If desired, an internally plasticized copolymer of methyl methacrylate and dimethylaminoethyl methacrylate may be used in conjunction with an external plasticizer as well.

The single figure of the drawing is a perspective view of one embodiment of the invention partially in cross-section and with parts cut away.

The lower alkyl methacrylates with which the invention is particularly concerned are methyl methacrylate, and ethyl methacrylate.

The invention, therefore, contemplates the incorporation in a finishing lacquer within suitable solvents with or without external plasticizers of either binary copolymers containing 90 to 99.5% by weight of the lower alkyl methacrylate (or a mixture of them) with 10% to ½%, respectively, of dimethylaminoethyl methacrylate or of copolymers of ternary, quaternary, etc., character containing at least 50% by weight of methyl methacrylate, or ethyl methacrylate or a mixture of these two esters, ½% to 10% by weight of dimethylaminoethyl methacrylate and the balance of one or more other copolymerizable materials. These copolymerizable materials may be any monoethylenically unsaturated comonomers including acrylonitrile, methacrylonitrile, styrene, vinyl acetate, or, in small amounts up to 2%, an acid, such as acrylic acid, methacrylic acid, or itaconic acid. When the comonomers just mentioned form the balance of the copolymer of the lower alkyl methacrylate and dimethylaminoethyl methacrylate, it is generally necessary to employ an external plasticizer to obtain proper flexibility. However, the copolymer may be internally plasticized to any desired extent by incorporating with the lower alkyl methacrylate and dimethylaminoethyl methacrylate one or more of the following comonomers: ethylene, isobutylene, esters of acrylic acid with alcohols having from 1 to 18 or more carbon atoms, such as methyl alcohol, ethyl alcohol, butyl alcohol, n-octyl alcohol, t-octyl alcohol, dodecyl alcohol, hexadecyl alcohol, octadecyl alcohol, and so on or esters of methacrylic acid with alcohols having 3 to 18 carbon atoms. If desired, the copolymer of methyl or ethyl methacrylate and dimethylaminoethyl methacrylate may contain units from both an internally plasticizing comonomer of the list just mentioned and one of the comonomers mentioned in the first list above. As stated previously, when a plasticizing comonomer is included, it may be unnecessary to include an external type of plasticizer in the lacquer.

The viscosity average molecular weight of the lower alkyl methacrylate copolymers may be in the range of 40,000 to 150,000 and is preferably between 90,000 and 130,000. By using copolymers in these ranges and especially in the latter of them, it is possible to produce sprayable lacquers of high solids, such as from about 12 to 20% by weight of non-volatile solids concentration. The copolymers may be prepared by granular, emulsion, or solution polymerization of the several comonomers and, if desired, a portion having a preferred narrow range of molecular weight may be extracted from the products of such polymerization procedures by preferential solvent techniques in accordance with well-known practice. A preferred method of preparing the copolymers involves introducing suitable proportions of the comonomers with a solvent which may be a solvent for both the monomers and the copolymer and with a catalyst, such as one of the well-known organic peroxide catalysts, such as benzoyl peroxide, or one of the well-known azo catalysts, such as α,α′-azodiisobutyronitrile, into a reaction vessel in which the mixture is heated with continuous agitation for a period of 2 to 9 hours followed by cooling.

The lacquer may contain one or more external plasticizers in an amount up to 50% by weight of the weight of the copolymer. Examples of plasticizers that are suitable include benzyl butyl phthalate, dibutyl phthalate, triphenyl phosphate, 2-ethyl hexyl benzyl phthalate and dicyclohexyl phthalate. Other well-known plasticizers for polymers of methyl and ethyl methacrylates which may be employed include diallyl phthalate, dibenzyl phthalate, butyl cyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl butyl glycolate, acetyl tributyl citrate, dibenzyl sebacate, tricresyl phosphate, toluene ethyl sulfonamide, the di 2-ethylhexyl ester of hexamethylene diphthalate, and di(methylcyclohexyl) phthalate. The particular plasticizer and the amount thereof used are chosen in accordance with the demand for compatibility.

Various solvents may be employed, such as toluene, xylenes, acetone, methyl ethyl ketone, methyl isobutyl ketone, methyl isopropyl ketone, amyl alcohol, 2-ethoxyethyl acetate, ethyl acetate, butyl lactate, amyl acetate, methyl acetate, denatured ethyl alcohol, isopropanol, diacetone alcohol, cyclohexanol, ethylene dichloride, diisobutyl ketone, cyclohexanone, 2-butoxyethanol, furfuryl, petroleum naphtha, boiling in the range of about 87° to about 145° C., cyclohexane, hexane, aromatic hydrocarbon mixtures, such as "Solvesso 150," and also various aliphatic, naphthenic and aromatic naphthas. While certain of these solvents cannot be used alone because of lack of solvent power for the copolymers but they can in a mixture with others. Obviously, mixtures of such solvents are generally quite useful.

The baking primer coats over which the copolymers of the present invention may be applied include the drying oil-modified alkyds, rosin-modified alkyds, mixed or co-reacted alkyds and aminoplasts, mixed or co-reacted alkyd/epoxy resins, mixed or co-reacted alkyd/aminoplast/epoxy resins, mixed or co-reacted epoxidized esters of higher fatty acids with aminoplast resins and so on. The incorporation of the dimethylaminoethyl methacrylate has been found to improve the adhesion of the lower alkyl methacrylate copolymers obtained without appreciably modifying the good qualities of the lower alkyl methacrylate polymer coating, especially in respect to hardness, flexibility, and durability of gloss and color on outdoor exposure. The adhesion has been found to be enhanced with respect to baked primers so that the use of masking tape in the application of multi-color designs has been found permissible. The use of a greater proportion of dimethylaminoethyl methacrylate than 10% by weight has been found to be undesirable because of noticeable loss in the desirable qualities obtained from the lower alkyl methacrylate component in the coatings. Generally, the optimum qualities of adhesion and durability of gloss and color are obtained when the dimethylaminoethyl methacrylate is used in the range of about 2% to 4% by weight of the copolymer and, accordingly, this range is preferred.

It has been found that the copolymer with dimethylaminoethyl methacrylate is quite distinctive in its quality of adhesion to the baking type of primers generally. With copolymers of the present invention, the adhesion to such primers is of such strong quality that it is frequently not even necessary to roughen the primer before application of the lacquers of the present invention in order to get adequate adhesion even sufficient to allow the application of masking tape shortly after the drying of the topcoat to permit the application of a multi-color design. When copolymers of methyl or ethyl methacrylate are produced which are of the same constitution except that the dimethylaminoethyl methacrylate is replaced with diethylaminoethyl methacrylate, the adhesion obtained on the baking type primer in most instances is reduced to such an extent that it is essential to roughen the surface of such primers to obtain adequate adhesion between the top coat and the primer and even with the roughening, the adhesion is sometimes insufficient to permit the use of masking tape shortly after the drying of the coating.

While, for certain purposes, a clear lacquer may be employed, it is quite general to include pigments in an amount up to 100% by weight of the polymer in the lacquer finishing compositions. Examples of suitable pigments include titanium dioxide, carbon black, iron blues, phthalocyanine blues and greens; metal oxides, hydroxides, sulfides, sulfates, silicates and chromates; organic maroons, aluminum flake, bronze powders, pearl essence, and various fillers or extenders such as talc, barytes, china clay and diatomaceous earth.

It will be obvious to those skilled in the organic coating art that the amount of pigment may be varied widely, depending on the effect desired. The amount of pigment, by weight based on the weight of the organic film-forming material, may vary between about 2% for light, high-hiding pigments, such as carbon black, and about 100% for heavy, low-hiding pigments such as lead chromate.

It is common practice in the coating art to prepare liquid coating compositions on a commercial basis in a highly concentrated form. In comparison with the same composition in a thinned or diluted form ready for application, the concentrated form is more resistant to pigment settling during storage, is cheaper to store and ship because less weight and space are involved, and is in a more adaptable condition for the addition of thinning and/or other modifying materials by the ultimate user to adjust the composition to his own liking. Therefore, the concentrated coating compositions from which the lacquers of this invention may be prepared by merely admixing appropriate organic liquids form a part of this invention. The maximum degree of concentration, i.e. the maximum non-volatile solids content, is limited only by the maximum consistency which can be conveniently handled by the manufacturer and the ultimate user. While concentrated lacquers having a non-volatile solids content of 75% by weight, or even higher, may be prepared; the normal concentration is usually between 30 and 60%. The minimum concentration is obviously the solids content of the ready-to-apply lacquers; but, as previously mentioned, such compositions are not usually prepared by the manufacturer because they are not adaptable to adjustment by the user.

The method of dispersing or grinding pigment in the film-forming materials is not critical provided a smooth, uniform dispersion of finely divided pigment is produced. Examples of suitable equipment well known in the art are ball, pebble, buhrstone, roller, and colloid mills and kneader-mixers, such as Banbury or Warner-Pfleiderer.

The concentrated lacquers may be reduced to whatever concentration is suitable for the particular manner of application. The application concentration may vary from about 5 to 30% non-volatile solids (that is, including plasticizer), depending upon the manner of application and the thickness of coating desired. For spraying, the concentration may be between 10 and 20% solids.

While the preferred lacquers of this invention contain, as film-forming materials, only copolymers of the present invention and ethyl methacrylate of the present invention and plasticizers therefor, suitable lacquers may be prepared by incorporating other compatible film-forming materials with the aforementioned ingredients. Examples of such additional film-forming materials are cellulose nitrate, other cellulose esters, alkyd resins, and polymers of the short chain alkyl esters of acrylic and methacrylic acids other than polymethyl methacrylate, the choice being dictated by the requirement for compatability. Obviously it is most convenient to incorporate the additional film-forming materials in the form of solutions.

The coatings may be air-dried under normal conditions of atmospheric temperature and humidity with good ventilation. Air-drying to a stage which permits handling may require 4 to 24 hours. Higher temperatures of drying may be employed, such as from about 140° to about 300° F. or more. The use of such elevated temperatures reduces the drying time so that drying at 150° to 200° F. may be fully accomplished in 30 to 60 minutes whereas the use of 250° to 300° F. generally shortens the time considerably.

Although the coating compositions of the present invention have been found to have advantageously improved adhesion to primed metals, nevertheless, they are also useful for applying decorative and protective coatings to articles manufactured from a variety of materials, such as wood, metal, ceramics and other organic and inorganic substances. While conventional air spraying is the preferred method of applying the products of this invention, obviously other methods may be used, such as hot air spraying, steam spraying, electrostatic spraying, spraying a preheated coating composition, dipping, brushing, and roller-coating.

The copolymers of the present invention containing ½% to 10% by weight of the amine groups mentioned may be mixed, to the extent they are compatible, with similar polymers which contain no amine groups the amounts of the polymers being such as to provide from ⅛% to 5% (by weight) of amine-containing units in the overall composition of the polymer blend. The preferred proportion of such amine-containing units is from about ½% to 2% of the overall weight of the polymer blend.

In the drawing reference numeral 2 indicates the metal base upon which there is imposed in adherent contact therewith a thermoset primer coating 3. On the primer coating 3 there is shown the topcoating of the copolymer of the alkylamino-ethyl acrylate or methacrylate which is adherent to the primer layer.

In the following examples which are illustrative of the present invention, the parts, percentages, and ratios are by weight unless otherwise indicated. In the examples following, the adhesiveness was tested by scribing X-shaped markes in the coating, applying Scotch tape to the marks, pressing the tape firmly against the coated surface by rubbing with a rubber, pencil eraser. The tape is then removed by lifting while pulling in a direction parallel to the plane of the surface so that the angle the tape makes as it leaves the surface is a small acute angle on the order of 15°. The test is done at two periods, the first about 10 to 30 minutes after the completion of the baking of the topcoat, the coating being cooled before application of the tape, and the second a day later.

Example A

A solution comprising 949 parts of methyl methacrylate, 51 parts of dimethylaminoethyl methacrylate, 2.5 parts of azobisisobutyronitrile and 670 parts of toluene is added in the course of two hours to a five liter flask maintained at 80° C. by means of external heating. The mixture in the flask is stirred during the addition and subsequent reaction and maintained at 80–85° C. The mixture is then diluted with 830 parts of toluene over a two-hour period, while stirring is continued at a temperature of 80–82° C. Heating and stirring are continued for a total of 12 hours and the mixture diluted with toluene to 30% resin solids (approximately 830 parts of toluene). The Gardner-Holdt viscosity is O (3.7 poises). The copolymer contains approximately 5.1% of dimethylaminoethyl methacrylate.

Example B

The procedure of Example A is repeated substituting for the comonomers, 954 parts of methyl methacrylate and 46 parts of diethylaminoethyl methacrylate. The copolymer contains approximately 4.6% of diethylaminoethyl methacrylate and is dissolved at 30% solids in toluene.

Example C

The procedure of Example A is repeated substituting for the comonomers 725 parts of methyl methacrylate, 210 parts of ethyl acrylate, and 65 parts of dimethylaminoethyl acrylate yielding a copolymer containing 6.5% of the last-named comonomer.

Example D

The procedure of Example A is repeated substituting for the comonomers 800 parts of ethyl methacrylate, 100 parts of butyl acrylate and 100 parts of dimethylaminoethyl methacrylate yielding a copolymer containing about 10% of the last-named comonomer.

Example E

A blend is made by mixing 500 parts of a homopolymer of methyl methacrylate with 500 parts of copolymer (solids) obtained in Example A. Each is dissolved in toluene so that the mixture is a 30% solution of polymer solids in toluene.

Example F

A blend is made by mixing 500 parts of a copolymer of 80% ethyl methacrylate and 20% butyl acrylate with 500 parts of the copolymer (solids) of Example D. Each is dissolved in toluene so that the mixture is a 30% solution of polymer solids in toluene.

Example 1

A primer is prepared by ball-milling a mixture of 156 parts of iron oxide, 78 parts of zinc chromate, 26 parts of micronized talc, 210 parts of a 60% solids solution in mineral thinner of a drying alkyd of medium oil length based on linseed oil, phthalic anhydride, and glycerol, 28 parts of a 50% solids solution in a 1:4 mixture of xylol and n-butanol of a butylated polymethylol melamine, and 100 parts of a 2:1 mixture of xylol and mineral thinner, and subsequently reducing the ball-milled mixture to a viscosity of 18 seconds in a No. 4 Ford cup with a 2:1 mixture of xylol and mineral thinner. The resulting primer having a 65 to 35 weight ratio of pigment to binder is coated by spraying on phosphatized (Bonderized) steel panels, air-dried 15 to 30 minutes, baked 45 minutes at 275° F., and cooled. Then the panels are sanded while wet with water, rinsed with water, and dried in an oven at 200° F. for 10 minutes. After sanding, the coating is approximately 1 mil in thickness.

A pigment paste is prepared from a mixture of 44.55 parts of rutile titanium dioxide, 0.45 part of lampblack, 45 parts of the 30% solution in toluene of the copolymer of methyl methacrylate and dimethylaminoethyl methacrylate of Example A, and 10 parts of 2-ethoxyethyl acetate by making four passes of such mixture through a roller mill. Then 40 parts of the resulting paste is mixed with 80 parts of the 30% copolymer solution obtained in Example A, 12.6 parts of butyl benzyl phthalate and 169 parts of a solvent composed of a 30/35/35 blend of 2-ethoxyethyl acetate, toluene, and methyl ethyl ketone to produce a lacquer having a 12-second No. 4 Ford cup viscosity.

The lacquer is sprayed over the primed steel panels, air-dried 3 to 5 minutes, and a second spraying of the lacquer is then made. This is then air-dried 15 to 30 minutes and then baked 30 minutes at 180° F.

On testing for adhesion as described above, substantially no removal of the coating occurred. However, similar coated panels (control) in which the top-coating was formed in the same way using instead of the copolymer solution of Example A, a 30% solution in toluene of a polymer of methyl methacrylate containing no amine-containing units showed substantially complete removal of the coating.

Example 2

The procedure of Example 1 is repeated, substituting for the two doses of the copolymer solution of Example A the same amounts of the copolymer solution obtained in Example B containing about 4.6% of diethylaminoethyl methacrylate. Similar results are obtained.

Example 3

The procedure of Example 1 is repeated, omitting the sanding of the primer, and substituting for the 210 parts of alkyd resin solution and the 28 parts of butylated polymethylol melamine the following:

210 parts of a solution (60% solids) in xylol of the tall oil fatty acid modified epoxy-alkyd obtained by the condensation of an isopropylidene-bis phenol/epichlorohydrin condensate with glycerol and phthalic acid anhydride and 28 parts of a solution (at 50% solids) in a 1:1 mixture of xylol and n-butanol of a butylated polymethylol urea.

Substantially no removal occurred on adhesion test. Whereas coated panels made in the same way using in place of the copolymer solution of Example A, a 30% solution in toluene of a homopolymer of methyl methacrylate show substantially complete removal of the coating.

Example 4

The procedure of Example 1 is repeated except that the sanding operation is omitted and the primer is made from 126 parts iron oxide
154 parts barytes
180 parts of the alkyl solution of Example 1
24 parts of the melamine condensate solution of Example 1 which was mixed with the same solvents and the same total amounts thereof as in Example 1 (but using a 70:30 mixture in place of the 2:1 mixture), ball-milled and reduced as in Example 1.

On testing, substantially no removal of coating is produced. Whereas the control panel shows substantially complete removal, such control panels being obtained in the same way but substituting for the copolymer solution of Example A, a 30% solution in toluene of poly(methyl methacrylate).

Example 5

The procedure of Example 1 is repeated except that the alkyd solution of the primer is increased to 233 parts and the solution of melamine condensate is omitted.

On testing for adhesion, substantially no removal of the coating occurred, whereas control panels made in the same way substituting poly(methyl methacrylate) for the copolymer of Example A show extensive removal of coating.

Example 6

The procedure of Example 3 is repeated except that the urea condensate is omitted from the primer and the amount of the epoxy-alkyd is increased from 210 parts to 225 parts. Good adhesion is obtained comparable to the improvement obtained by Example 3.

Example 7

The procedure of Example 1 is repeated substituting corresponding amounts of the copolymer solution of Example C for that of Example A wherever used. Excellent adhesion is obtained.

Example 8

The procedure of Example 1 is repeated substituting corresponding amounts of the copolymer solution of Example C for that of Example A wherever used and anodized aluminum is used instead of phosphatized steel. Good adhesion results, the improvement being comparable to that obtained on steel panels by Example 1.

Example 9

The procedure of Example 3 is repeated, except that the steel panels were replaced by burnished copper, brass, and Monel metal panels with excellent results.

Example 10

The procedure of Example 1 is repeated except that the copolymer solution of Example D is used in place of the copolymer solution of Example A. The improvement in adhesion is comparable to that obtained in Example 1.

Example 11

The procedure of Example 1 is repeated except that the copolymer solution of Example E is used in place of the copolymer solution of Example A. The improvement in adhesion is comparable to that obtained in Example 1.

Instead of the methacrylates of dimethylaminoethanol and diethylaminoethanol, the acrylates may be used.

We claim:

1. As an article of manufacture, a metal base, a baked primer coating on the surface of the metal, the binder of said coating being formed from a thermosetting resin, and, superimposed on the primer coating, a coating of a copolymer of an ester selected from the group consisting of methyl methacrylate and ethyl methacrylate and 1% to 10% by weight of copolymerized units selected from the group consisting of dimethylaminoethyl acrylate and methacrylate and diethylaminoethyl acrylate and methacrylate.

2. As an article of manufacture, a metal base, a baked primer coating on the surface of the metal, the binder of said coating being formed from a thermosetting resin, and, superimposed on the primer coating, a coating of a copolymer, having a viscosity average molecular weight of 40,000 to 150,000, of an ester selected from the group consisting of methyl methacrylate and ethyl methacrylate and 1% to 10% by weight of copolymerized units selected from the group consisting of dimethylaminoethyl acrylate and methacrylate and diethylaminoethyl acrylate and methacrylate.

3. As an article of manufacture, a metal base, a baked primer coating comprising an alkyd resin on the surface of the metal, and, superimposed on the primer coating, a coating of a copolymer of an ester selected from the group consisting of methyl methacrylate and ethyl methacrylate and 1% to 10% by weight of copolymerized units selected from the group consisting of dimethylaminoethyl acrylate and methacrylate and diethylaminoethyl acrylate and methacrylate.

4. As an article of manufacture, a metal base, a baked primer coating comprising an aminoplast resin on the surface of the metal, and, superimposed on the primer coating, a coating of a copolymer of an ester selected from the group consisting of methyl methacrylate and ethyl methacrylate and 1% to 10% by weight of copolymerized units selected from the group consisting of dimethylaminoethyl acrylate and methacrylate and diethylaminoethyl acrylate and methacrylate.

5. As an article of manufacture, a metal base, a baked primer coating comprising a drying-oil modified alkyd on the surface of the metal, and, superimposed on the primer coating, a coating of a copolymer of an ester selected from the group consisting of methyl methacrylate and ethyl methacrylate and 1% to 10% by weight of copolymerized units selected from the group consisting of dimethylaminoethyl acrylate and methacrylate and diethylaminoethyl acrylate and methacrylate.

6. As an article of manufacture, a metal base, a baked primer coating comprising an epoxy-modified alkyd on the surface of the metal, and, superimposed on the primer coating, a coating of a copolymer of an ester selected from the group consisting of methyl methacrylate and ethyl methacrylate and 1% to 10% by weight of copolymerized units selected from the group consisting of dimethylaminoethyl acrylate and methacrylate and diethylaminoethylacrylate and methacrylate.

7. As an article of manufacture, a metal base, a baked primer coating comprising a mixture of an alkyd and an aminoplast resin on the surface of the metal, and, superimposed on the primer coating, a coating of a copolymer of an ester selected from the group consisting of methyl methacrylate and ethyl methacrylate and 1% to 10% by weight of copolymerized units selected from the group consisting of dimethylaminoethyl acrylate and methacrylate and diethylaminoethyl acrylate and methacrylate.

8. As an article of manufacture, a metal base, a baked primer coating comprising a mixture of an alkyd and an alkylated polymethylol melamine on the surface of the metal, and, superimposed on the primer coating, a coating of a copolymer of an ester selected from the group consisting of methyl methacrylate and ethyl methacrylate and 1% to 10% by weight of copolymerized units selected from the group consisting of dimethylaminoethyl acrylate and methacrylate and diethylaminoethyl acrylate and methacrylate.

9. As an article of manufacture, a metal base, a baked primer coating comprising a mixture of an alkyd and an alkylated polymethylol urea on the surface of the metal, and, superimposed on the primer coating, a coating of a copolymer of an ester selected from the group consisting of methyl methacrylate and ethyl methacrylate and 1% to 10% by weight of copolymerized units selected from the group consisting of dimethylaminoethyl acrylate and methacrylate and diethylaminoethyl acrylate and methacrylate.

10. As an article of manufacture, a metal base of steel, a baked primer coating on the surface of the metal, the binder of said coating being formed from a thermosetting resin, and, superimposed on the primer coating, a coating of a copolymer of an ester selected from the group consisting of methyl methacrylate and ethyl methacrylate and 1% to 10% by weight of copolymerized units selected from the group consisting of dimethylaminoethyl acrylate and methacrylate and diethylaminoethyl acrylate and methacrylate.

11. An article as defined in claim 10 in which the binder of the top-coating comprises a copolymer of methyl methacrylate with dimethylaminoethyl methacrylate.

12. An article as defined in claim 10 in which the binder of the top-coating comprises a copolymer of methyl methacrylate with diethylaminoethyl methacrylate.

13. An article as defined in claim 10 in which the binder of the top-coating comprises a copolymer of ethyl methacrylate with dimethylaminoethyl methacrylate.

14. An article as defined in claim 10 in which the binder of the top-coating comprises a copolymer of ethyl methacrylate with diethylaminoethyl methacrylate.

15. An article as defined in claim 10 in which the binder of the top-coating comprises a copolymer of methyl acrylate, ethyl acrylate and dimethylaminoethyl methacrylate.

16. A method which comprises the steps of applying a coating of a baking type primer to a metal substrate, the binder of said coating being formed from a thermosetting resin, drying and baking the primer, and subsequently applying to the coating obtained from the primer a solution in an organic solvent of a copolymer of an ester selected from the group consisting of methyl methacrylate and ethyl methacrylate and 1% to 10% by weight of copolymerized units selected from the group consisting of dimethylaminoethyl acrylate and methacrylate and diethylaminoethyl acrylate and methacrylate and then drying the coated metal.

17. A method which comprises the steps of applying a solution of a thermosetting resin to the surface of a metal, drying the solution to form a coating on the metal, baking the coated metal to convert the coating to an infusible and insoluble condition, applying to the infusible coating a solution in an organic solvent of a copolymer of an ester selected from the group consisting of methyl methacrylate and ethyl methacrylate and 1% to 10% by weight of copolymerized units selected from the group consisting of dimethylaminoethyl acrylate and methacrylate and diethylaminoethyl acrylate and methacrylate and then drying the coated metal.

18. A method as defined in claim 17 in which the copolymer is a copolymer of methyl methacrylate with 0.5% to 10% of dimethylaminoethyl methacrylate.

19. A method as defined in claim 17 in which the copolymer is a copolymer of methyl methacrylate with 0.5% to 10% of dimethylaminoethyl methacrylate and the thermosetting resin is an alkyd.

References Cited in the file of this patent

UNITED STATES PATENTS

| | | |
|---|---|---|
| 2,129,694 | Izard | Sept. 13, 1938 |
| 2,138,762 | Harmon | Nov. 29, 1938 |
| 2,441,130 | Bernstein et al. | May 11, 1948 |
| 2,782,131 | Johnson | Feb. 19, 1957 |